United States Patent
Li et al.

(10) Patent No.: US 12,301,119 B2
(45) Date of Patent: May 13, 2025

(54) ISOLATED SWITCHING REGULATORS WITH SMART POWER SUPPLY AND THE METHOD THEREOF

(71) Applicant: Chengdu Monolithic Power Systems Co., Ltd., Chengdu (CN)

(72) Inventors: Hui Li, Hangzhou (CN); Siran Wang, Hangzhou (CN)

(73) Assignee: Chengdu Monolithic Power Systems Co., Ltd., Sichuan (CN)

( * ) Notice: Subject to any disclaimer, the term of this patent is extended or adjusted under 35 U.S.C. 154(b) by 246 days.

(21) Appl. No.: 18/070,853

(22) Filed: Nov. 29, 2022

(65) Prior Publication Data

US 2023/0179104 A1    Jun. 8, 2023

(30) Foreign Application Priority Data

Dec. 3, 2021 (CN) .......................... 202111472841.9

(51) Int. Cl.
*H02M 3/335* (2006.01)
*H02M 1/00* (2006.01)

(52) U.S. Cl.
CPC ....... *H02M 3/33576* (2013.01); *H02M 1/007* (2021.05)

(58) Field of Classification Search
CPC .......................... H02M 3/33576; H02M 1/007
See application file for complete search history.

(56) References Cited

U.S. PATENT DOCUMENTS

| | | | |
|---|---|---|---|
| 9,595,885 B2 | 3/2017 | Wang et al. | |
| 10,277,130 B2 * | 4/2019 | Quigley | H02M 3/33571 |
| 10,348,215 B2 | 7/2019 | Feng | |
| 10,432,104 B2 | 10/2019 | Li et al. | |
| 10,673,344 B2 | 6/2020 | Wang | |
| 10,763,753 B2 * | 9/2020 | Pastore | H02M 3/33515 |
| 10,784,791 B2 | 9/2020 | Feng et al. | |
| 10,879,810 B2 | 12/2020 | Zhang | |
| 10,951,124 B2 | 3/2021 | Li et al. | |
| 11,031,877 B2 | 6/2021 | Miao | |
| 11,245,327 B2 | 2/2022 | Feng et al. | |
| 11,381,151 B2 | 7/2022 | Ye et al. | |
| 11,398,782 B2 | 7/2022 | Wang | |
| 2018/0062530 A1 * | 3/2018 | Kong | H02M 1/08 |
| 2018/0269797 A1 * | 9/2018 | Vemuri | H02M 3/33592 |

OTHER PUBLICATIONS

U.S. Appl. No. 17/521,000, filed Nov. 8, 2021, Chengdu Monolithic Power Systems.
U.S. Appl. No. 17/541,576, filed Dec. 3, 2021, Monolithic Power Systems.

* cited by examiner

*Primary Examiner* — Adolf D Berhane
(74) *Attorney, Agent, or Firm* — Perkins Coie LLP

(57) ABSTRACT

An isolated switching regulator with adjustable power supplies is discussed. The isolated switching regulator includes a control circuit having a loop controller and a driver, which are powered by different power source based on different output voltage conditions.

14 Claims, 3 Drawing Sheets

ISOLATED SWITCHING REGULATORS WITH SMART POWER SUPPLY AND THE METHOD THEREOF

CROSS-REFERENCE TO RELATED APPLICATIONS

This application claims priority to and the benefit of Chinese Patent Application No. 202111472841.9, filed Dec. 3, 2021, which is incorporated herein by reference in its entirety.

BACKGROUND OF THE INVENTION

Isolated switching regulators typically adopt a transformer to perform isolation between primary side and secondary side. Synchronous rectification (SR) technology is widely used in the secondary side of the isolated switching regulator to achieve high efficiency. The so-called SR technology uses a controllable power switch (e.g. a MOSFET) to replace a power diode to co-operate with a main power switch in a power stage, so as to convert an unregulated input voltage into a desired output voltage. Because the controllable power switch has a lower ON resistance, the power consumption with controllable power switch is lower, which brings higher power conversion efficiency.

A control circuit is typically set at the secondary side of the switching regulator to control the main power switch and the controllable power switch in order to achieve better control. Typically, power supplies are needed for both logical control circuits which is used to control the power switches and a driver which drives the power switches. Prior art uses one power source to provide power supply to both logical control circuits and the driver. In applications where the output voltage is wide and the minimum output voltage is low, prior art adopts a self-power supply or an extra auxiliary winding to provide power supply to the above logical control circuits and driver. However, the self-power supply may be not sufficient in the light load condition, whereas the auxiliary winding is high cost and complicated.

SUMMARY OF THE INVENTION

In accordance with an embodiment of the present invention, an isolated switching regulator is discussed. The isolated switching regulator comprises: a primary circuit, a secondary circuit, a control circuit, a first capacitor and a second capacitor. The primary circuit is configured to receive an input voltage, and has a primary power switch coupled to a primary winding of a transformer. The secondary circuit is configured to provide an output voltage, and has a secondary power switch coupled to a secondary winding of the transformer. The control circuit includes a loop controller and a driver, wherein the loop controller is configured to provide a control signal, and the driver is configured to generate a drive signal to control the secondary power switch in response to the control signal. The first capacitor is configured to store a first power supply to power the loop controller, wherein the first power supply is derived from the output voltage. The second capacitor is configured to store a second power supply to power the driver, wherein the second power supply is derived from the output voltage or from the secondary winding.

In addition, in accordance with an embodiment of the present invention, a control circuit used in an isolated switching regulator is discussed. The isolated switching regulator includes a primary power switch coupled to a primary winding of a transformer and a secondary power switch coupled to a secondary winding of the transformer. The control circuit comprises: a loop controller, configured to provide a control signal; and a driver, configured to generate a drive signal to control the secondary power switch in response to the control signal. The loop controller is configured to be powered by an output voltage of the switching regulator. The driver is configured to be powered by the output voltage of the switching regulator or by a voltage across the secondary winding.

Furthermore, in accordance with an embodiment of the present invention, a power supplying method used in an isolated switching regulator is discussed. The isolated switching regulator includes: a primary power switch coupled to a primary winding of a transformer, a secondary power switch coupled to a secondary winding of the transformer, a loop controller configured to provide a control signal, and a driver configured to drive the secondary power switch in response to the control signal. The power supplying method comprises: powering the loop controller and the driver by an output voltage of the isolated switching regulator; and evaluating a power capability of the output voltage: if the output voltage is insufficient to power the driver, powering the driver by a voltage across the secondary winding; otherwise, continuing to power the driver by the output voltage.

The use of the similar reference label in different drawings indicates the same of like components.

DETAILED DESCRIPTION OF THE INVENTION

Embodiments of circuits for isolated switching regulators are described in detail herein. In the following description, some specific details, such as example circuits for these circuit components, are included to provide a thorough understanding of embodiments of the invention. One skilled in relevant art will recognize, however, that the invention can be practiced without one or more specific details, or with other methods, components, materials, etc.

The following embodiments and aspects are illustrated in conjunction with circuits and methods that are meant to be exemplary and illustrative. In various embodiments, the above problem has been reduced or eliminated, while other embodiments are directed to other improvements.

Figure 1:
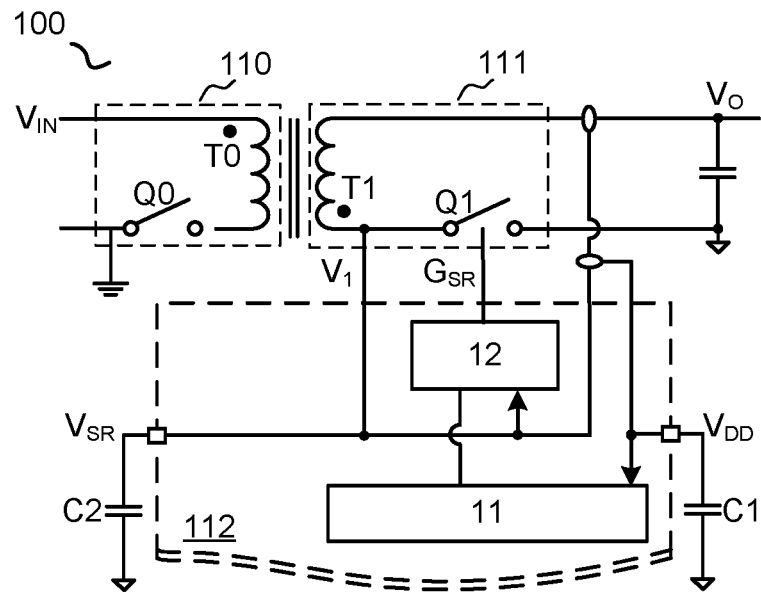
FIG. 1 schematically shows an isolated switching regulator 100 in accordance with an embodiment of the present invention.

FIG. 1 schematically shows an isolated switching regulator 100 in accordance with an embodiment of the present invention. In the example of FIG. 1, the isolated switching regulator 100 comprises: a primary circuit 110, a secondary circuit 111, a control circuit 112, a first capacitor C1, and a second capacitor C2. The primary circuit 110 is configured to receive an input voltage $V_{IN}$, and has a primary power switch Q0 coupled to a primary winding T0 of a transformer T. The secondary circuit 111 is configured to provide an output voltage $V_O$, and has a secondary power switch Q1 coupled to a secondary winding T1 of the transformer T. The control circuit 112 includes a loop controller 11 and a driver 12, wherein the loop controller 11 is configured to provide a control signal CsR, and the driver 12 is configured to generate a drive signal $G_{SR}$ to control the secondary power switch Q1 in response to the control signal CsR. The first capacitor C1 is configured to store a first power supply $V_{DD}$ to power the loop controller 11, wherein the first power supply $V_{DD}$ is derived from the output voltage $V_O$. The second capacitor C2 is configured to store a second power supply $V_{SR}$ to power the driver 12, wherein the second power supply $V_{SR}$ is derived from the output voltage $V_O$ or from a voltage $V_1$ across the secondary winding T1.

In one embodiment of the present invention, when the output voltage $V_O$ provides a sufficient power supply to the driver 12 (e.g. the output voltage $V_O$ or the power supply derived from the output voltage is higher than a voltage threshold), the second power supply $V_{SR}$ is derived from the output voltage $V_O$. On the contrary, if the output voltage provides an insufficient power supply to the driver 12 (e.g. the output voltage $V_O$ or the power supply derived from the output voltage is lower than the voltage threshold), the second power supply $V_{SR}$ is derived from the secondary winding T1.

In one embodiment of the present invention, when the power supply provided by the output voltage $V_O$ is lower than that provided by the secondary winding T1, the second power supply $V_{SR}$ is derived from the secondary winding T1; and when the power supply provided by the output voltage $V_O$ is higher than that provided by the secondary winding T1, the second power supply $V_{SR}$ is derived from the output voltage $V_O$.

That is, the loop controller 11 is powered by the output voltage $V_O$; and the driver 12 is either powered by the output voltage $V_O$ or by the voltage $V_1$ across the secondary winding T1. When the output voltage is not high enough, the driver 12 is powered by the voltage $V_1$ across the secondary winding T1; and when the output voltage is high enough, the driver 12 is powered by the output voltage $V_O$.

In one embodiment of the present invention, the output voltage $V_O$ may have a wide voltage range based on different applications, e.g., the output voltage $V_O$ may be as low as 3.3V, or may be as high as dozens of volts (e.g., 28V or higher). When the output voltage rises to a certain voltage value, which is high enough to drive the secondary power switch Q1, the second capacitor C2 is charged by the output voltage $V_O$, to obtain the second power supply $V_{SR}$; and when the output voltage $V_O$ falls to a certain voltage value, e.g., when the output voltage $V_O$ falls to 3.3V, the power supply provided by the output voltage $V_O$ may not ensure the driver's normal operation. Then, the power supply of the driver 12 is switched to the voltage $V_1$ across the secondary winding T1.

In one embodiment of the present invention, the isolated switching regulator may comprise a flyback converter, a forward converter, a resonant (e.g. LLC) converter, or other appropriate converters. The control circuit 112 may only control the secondary power switch Q1, or may both control the primary power switch Q0 and the secondary power switch Q1 (i.e., the well know all-in-one control technology, which integrates the control unit controlling the primary power switch and the control unit controlling the secondary power switch into one integrated circuit, and uses an isolated capacitor to deliver control signals from the secondary side to the primary side).

Figure 2:
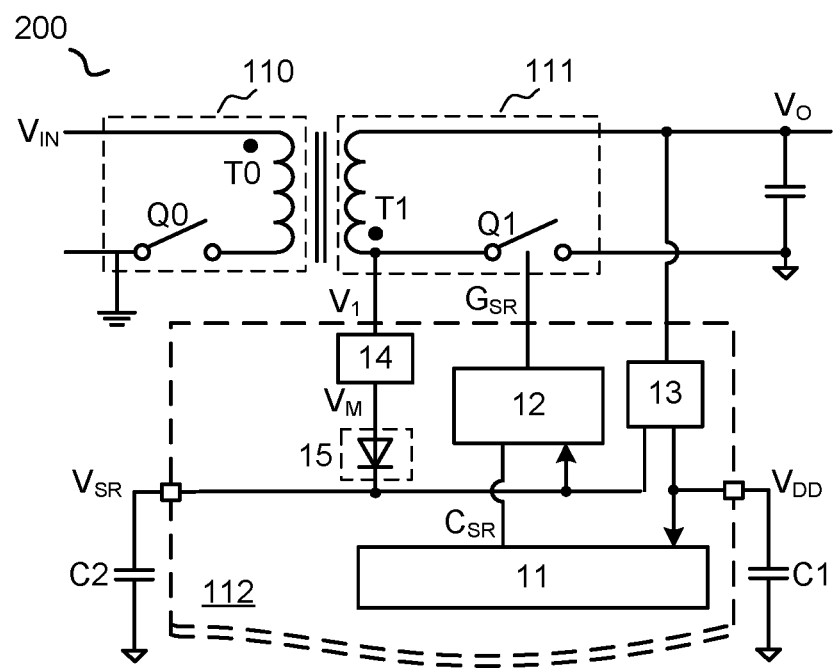
FIG. 2 schematically shows an isolated switching regulator 200 with a circuit configuration of the control circuit 112 in accordance with an embodiment of the present invention.

FIG. 2 schematically shows an isolated switching regulator 200 with a circuit configuration of the control circuit 112 in accordance with an embodiment of the present invention. The isolated switching regulator 200 shown in FIG. 2 schematically shows the way the first capacitor C1 and the second capacitor C2 are charged by the output voltage $V_O$ and the voltage $V_1$ across the secondary winding T1. Specifically, in the example of FIG. 2, besides the loop controller 11 and the driver 12, the control circuit 112 further comprises: a first convert unit 13, configured to convert the output voltage $V_O$ to the first power supply $V_{DD}$ to power the loop controller 11. The first convert unit 13 is further configured to convert the output voltage $V_O$ to the second power supply $V_{SR}$ to power the driver 12. The control circuit 112 further comprises: a second convert unit 14, configured to convert the voltage across the secondary winding T1 to the second power supply $V_{SR}$ to power the driver 12 when the output voltage $V_O$ is insufficient to power the driver 12.

In one embodiment of the present invention, when the power supply $V_{SR}$ converted by the first convert unit 13 is lower than that (e.g. an intermediate voltage $V_M$) converted by the second convert unit 14, the output voltage is insufficient to power the driver 12. Then, the driver 12 is powered by the secondary winding T1. As shown in FIG. 2, the control circuit 112 further comprises an intermediate circuit 15, configured to deliver the intermediate voltage $V_M$ to the second capacitor C2 to power the driver 12 when the second power supply $V_{SR}$ converted by the first convert unit 13 is lower than the intermediate voltage $V_M$.

In one embodiment of the present invention, the intermediate circuit 15 comprises a diode.

In one embodiment of the present invention, when the output voltage $V_O$ or the power supply $V_{SR}$ derived from the output voltage $V_O$ is lower than a threshold voltage, the output voltage $V_O$ is insufficient to power the driver 12. Then, the driver 12 is powered by the secondary winding T1, as shown in FIG. 3.

Figure 3:
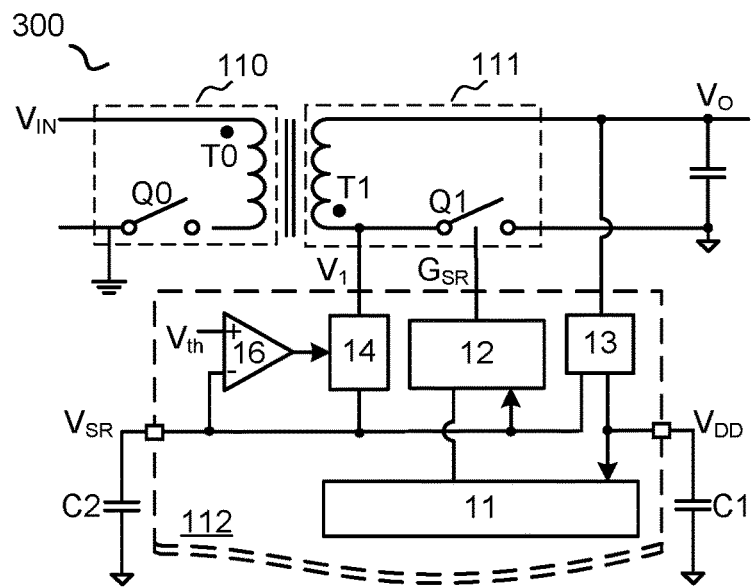
FIG. 3 schematically shows an isolated switching regulator 300 with another circuit configuration of the control circuit 112 in accordance with an embodiment of the present invention.

FIG. 3 schematically shows an isolated switching regulator 300 with another circuit configuration of the control circuit 112 in accordance with an embodiment of the present invention. Specifically, in the example of FIG. 3, the control circuit 112 further comprises: a first convert unit 13, configured to convert the output voltage $V_O$ to the first power supply $V_{DD}$ to power the loop controller 11. The first convert unit 13 is further configured to convert the output voltage $V_O$ to the second power supply $V_{SR}$ to power the driver 12. The control circuit 112 further comprises: a comparison unit 16, configured to compare the second power supply $V_{SR}$ with a threshold voltage $V_{th}$; and a second convert unit 14, configured to convert the voltage $V_1$ across the secondary winding T1 to the second power supply $V_{SR}$ to power the driver 12 when the second power supple $V_{SR}$ is lower than the threshold voltage $V_{th}$.

Figure 4:
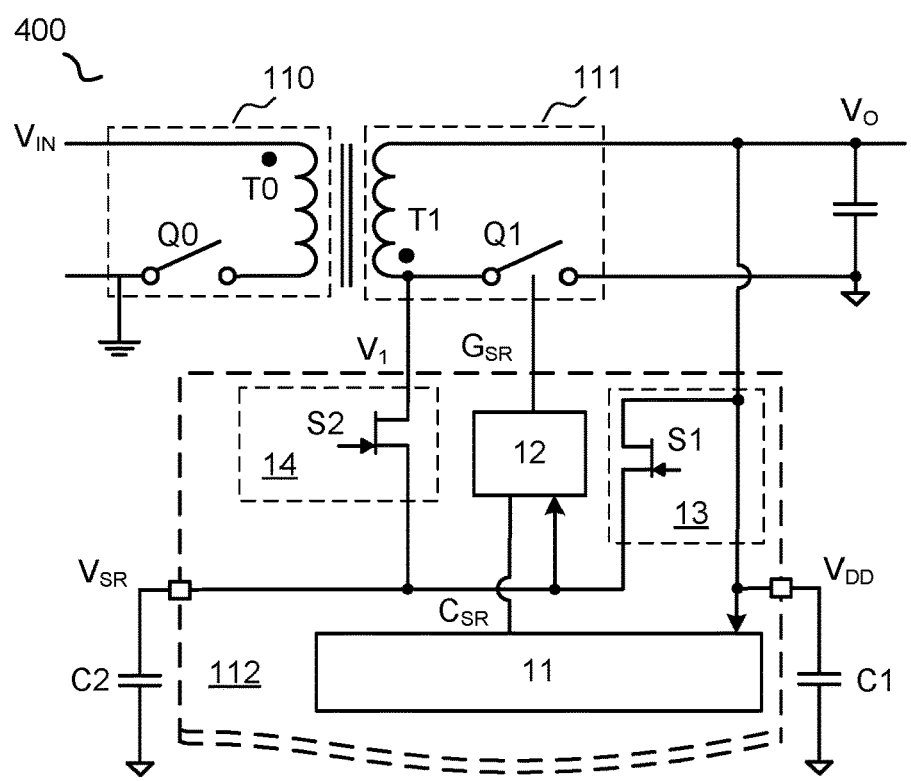
FIG. 4 schematically shows an isolated switching regulator 400 with circuit configurations of the first convert unit 13 and the second convert unit 14 in accordance with an embodiment of the present invention.

FIG. 4 schematically shows an isolated switching regulator 400 with circuit configurations of the first convert unit 13 and the second convert unit 14 in accordance with an embodiment of the present invention. Specifically, in the example of FIG. 4, the first convert unit 13 comprises: a first switch S1, configured to convert the output voltage $V_O$ to the second power supply $V_{SR}$, which is stored at the second capacitor C2. The second convert unit 14 comprises: a second switch S2, configured to convert the voltage $V_1$ across the secondary winding T1 to the second power supply $V_{SR}$, which is stored at the second capacitor C2.

In one embodiment of the present invention, the first switch S1 is ON when the output voltage $V_O$ (or the second power supply $V_{SR}$) is higher than the threshold voltage, to convert the output voltage $V_O$ to the second power supply $V_{SR}$; and the second switch S2 is ON when the output voltage $V_O$ (or the second power supply $V_{SR}$) is lower than the threshold voltage, to convert the voltage $V_1$ across the secondary winding T1 to the second power supply $V_{SR}$. In another embodiment of the present invention, the first switch S1 and the second switch S2 are maintained to be ON during the normal operation of the isolated switching regulator, and the driver 12 is configured to select the power supply by way of the intermediate circuit 14 as shown in FIG. 2.

In one embodiment of the present invention, the first switch S1 or the second switch S2 may operate at the linear region (i.e., operate as a low dropout regulator), to convert the output voltage $V_O$ or the voltage $V_1$ across the secondary winding T1 to the second power supply $V_{SR}$.

In another embodiment of the present invention, the first switch S1 or the second switch S2 may operate at the saturation region (i.e., operate at switching mode), to deliver the output voltage $V_O$ or the voltage $V_1$ across the secondary winding T1 to the second capacitor C2.

In the example of FIG. 4, the first capacitor C1 is directly charged by the output voltage $V_O$, to obtain the first power supply $V_{DD}$. However, one skilled in the art should realize that, in other embodiments of the present invention, the output voltage $V_O$ may be delivered to the first capacitor after conversion, as shown in below FIG. 5.

Figure 5:
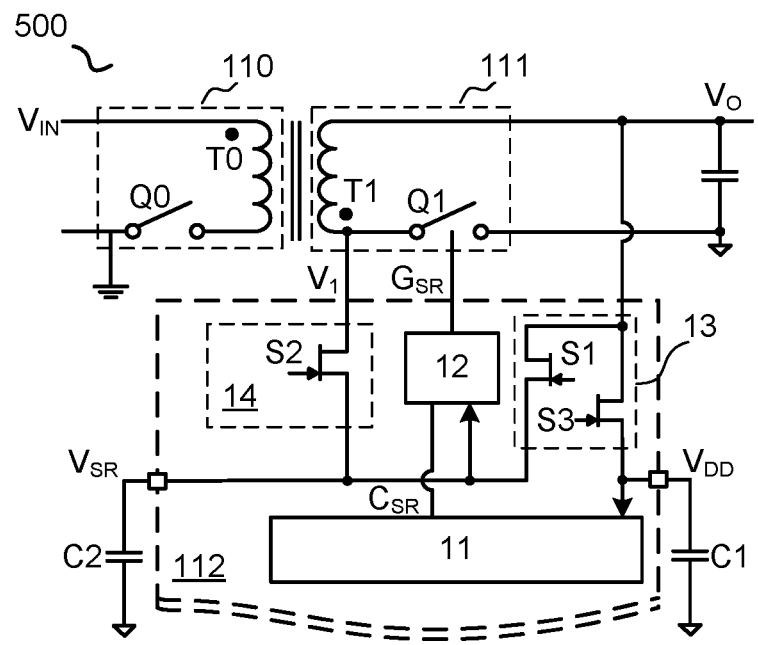
FIG. 5 schematically shows an isolated switching regulator 500 with circuit configurations of the first convert unit 13 and the second convert unit 14 in accordance with another embodiment of the present invention.

FIG. 5 schematically shows an isolated switching regulator 500 with circuit configurations of the first convert unit 13 and the second convert unit 14 in accordance with another embodiment of the present invention. Specifically, in the example of FIG. 5, the first convert unit 13 further comprises: a third switch S3, configured to be ON or to operate at the linear mode during the isolated switching regulator's operation, to convert the output voltage $V_O$ to the first power supply $V_{DD}$, which is stored at the first capacitor C1.

Figure 6:
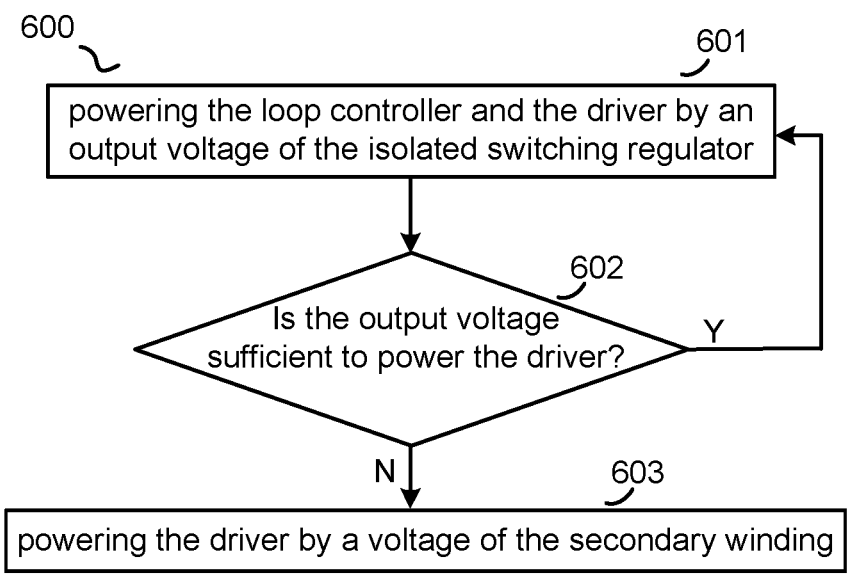
FIG. 6 schematically shows a power supplying method 600 used in an isolated switching regulator in accordance with another embodiment of the present invention.

FIG. 6 schematically shows a power supplying method used in an isolated switching regulator in accordance with another embodiment of the present invention. The isolated switching regulator includes: a primary power switch coupled to a primary winding of a transformer, a secondary power switch coupled to a secondary winding of the transformer, a loop controller configured to provide a control signal, and a driver configured to drive the secondary power switch in response to the control signal. The power supplying method comprising:

Step 601, powering the loop controller and the driver by an output voltage of the isolated switching regulator.

Step 602, evaluating a power capability of the output voltage: if the output voltage is insufficient to power the driver, entering step 603; otherwise, back to step 601, continuing to power the driver by the output voltage.

Step 603, powering the driver by the secondary winding.

In one embodiment of the present invention, the step of evaluating a power capability of the output voltage comprises: comparing a voltage level of a signal converted from the output voltage with a threshold voltage: if the voltage level of the signal converted from the output voltage is lower than the threshold voltage, the power supply is insufficient to power the driver; otherwise, the power supply is capable to power the driver.

In another embodiment of the present invention, the step of evaluating a power capability of the output voltage comprises: comparing the voltage level of the signal converted from the output voltage with that from the secondary winding, if the voltage level of the signal converted from the output voltage is lower than that from the secondary winding, the output voltage is insufficient to power the driver; otherwise, the power supply is capable to power the driver.

In one embodiment of the present invention, the output voltage is converted to a first power supply and a second power supply, to respectively power the loop controller and the driver.

Several embodiments of the forgoing isolated switching regulator and the power supplying method adjust the power supply of the driver based on different output voltages. If the output voltage is sufficient to power the driver, the loop controller and the driver are both powered by the output voltage. If the output voltage is insufficient to power the driver, the driver is power by the secondary winding, and the loop controller is maintained to be powered by the output voltage, so as to ensure the normal operation of the system. In addition, no auxiliary winding is needed, which lowers the cost.

It is to be understood in these letters patent that the meaning of "A" is coupled to "B" is that either A and B are connected to each other as described below, or that, although A and B may not be connected to each other as described above, there is nevertheless a device or circuit that is connected to both A and B. This device or circuit may include active or passive circuit elements, where the passive circuit elements may be distributed or lumped-parameter in nature. For example, A may be connected to a circuit element that in turn is connected to B.

This written description uses examples to disclose the invention, including the best mode, and also to enable a person skilled in the art to make and use the invention. The patentable scope of the invention may include other examples that occur to those skilled in the art.

The invention claimed is:

1. An isolated switching regulator, comprising:
   a primary circuit, configured to receive an input voltage, the primary circuit having a primary power switch coupled to a primary winding of a transformer;
   a secondary circuit, configured to provide an output voltage, the secondary circuit having a secondary power switch coupled to a secondary winding of the transformer;
   a control circuit, including a loop controller and a driver, wherein the loop controller is configured to provide a control signal, and the driver is configured to generate a drive signal to control the secondary power switch in response to the control signal;
   a first capacitor, configured to store a first power supply to power the loop controller, wherein the first power supply is configured to be derived from the output voltage; and
   a second capacitor, configured to store a second power supply to power the driver, wherein the second power supply is configured to be derived from the output voltage or from a voltage across the secondary winding; wherein:

when the output voltage is operable to provide a sufficient power supply to the driver, the second power supply is configured to be derived from the output voltage; and when the output voltage is operable to provide an insufficient power supply to the driver, the second power supply is configured to be derived from the voltage across the secondary winding.

2. The isolated switching regulator of claim 1, wherein the control circuit further comprises:

a first convert unit, configured to convert the output voltage to the first power supply to store at the first capacitor, to power the loop controller, wherein the first convert unit is further configured to convert the output voltage to the second power supply store at the second capacitor, to power the driver;

a second convert unit, configured to convert the voltage across the secondary winding to an intermediate voltage; and an intermediate circuit, configured to deliver the intermediate voltage to the second capacitor when the second power supply is lower than the intermediate voltage, to power the driver.

3. The isolated switching regulator of claim 1, wherein the control circuit further comprises:

a first convert unit, configured to convert the output voltage to the first power supply to store at the first capacitor, to power the loop controller, wherein the first convert unit is further configured to convert the output voltage to the second power supply to store at the second capacitor, to power the driver;

a comparison unit, configured to compare the second power supply with a threshold voltage; and a second convert unit, configured to convert the voltage across the secondary winding to the second power supply to store at the second capacitor when the second power supple converted from the output voltage is lower than the threshold voltage, to power the driver.

4. The isolated switching regulator of claim 3, wherein:

the first convert unit comprises a first switch, configured to be ON or to operate at a linear mode when the output voltage is sufficient to power the driver, to convert the output voltage to the second power supply; and the second convert unit comprises a second switch, configured to be ON or to operate at the linear mode when the output voltage is insufficient to power the driver, to convert the voltage across the secondary winding to the second power supply.

5. The isolated switching regulator of claim 4, wherein the first convert unit further comprises:

a third switch, configured to be ON or to operate at the linear mode during the isolated switching regulator's operation, to convert the output voltage to the first power supply, to power the loop controller.

6. A control circuit used in an isolated switching regulator, the isolated switching regulator including a primary power switch coupled to a primary winding of a transformer and a secondary power switch coupled to a secondary winding of the transformer, the control circuit comprising:

a loop controller, configured to provide a control signal; and a driver, configured to generate a drive signal to control the secondary power switch in response to the control signal; wherein the loop controller is configured to be powered by an output voltage of the switching regulator; and the driver is configured to be powered by the output voltage of the switching regulator or by a voltage across the secondary winding; when the output voltage is operable to provide a sufficient power supply to the driver, the second power supply is configured to be derived from the output voltage; and when the output voltage is operable to provide an insufficient power supply to the driver, the second power supply is configured to be derived from the voltage across the secondary winding.

7. The control circuit of claim 6, wherein:

when a power supply of the driver derived from the output voltage is higher than a threshold voltage, the driver is powered by the output voltage; and when the power supply of the driver derived from the output voltage is lower than the threshold voltage, the driver is powered by the voltage across the secondary winding.

8. The control circuit of claim 6, further comprising:

a first convert unit, configured to convert the output voltage to a first power supply, to power the loop controller, wherein the first convert unit is further configured to convert the output voltage to a second power supply, to power the driver;

a second convert unit, configured to convert the voltage across the secondary winding to an intermediate voltage; and an intermediate circuit, configured to deliver the intermediate voltage to the driver when the second power supply is lower than the intermediated voltage.

9. The control circuit of claim 6, further comprising:

a first convert unit, configured to convert the output voltage to a first power supply to power the loop controller, wherein the first convert unit is further configured to convert the output voltage to a second power supply to power the driver;

a comparison unit, configured to compare the second power supply with a threshold voltage; and a second convert unit, configured to convert the voltage across the secondary winding to the second power supply to power the driver, when the second power supple converted from the output voltage is lower than the threshold voltage.

10. The control circuit of claim 9, wherein:

the first convert unit comprises a first switch, configured to be ON or to operate at a linear mode when the output voltage is sufficient to power the driver, to convert the output voltage to the second power supply; and the second convert unit comprises a second switch, configured to be ON or to operate at the linear mode when the output voltage is insufficient to power the driver, to convert the voltage across the secondary winding to the second power supply.

11. The control circuit of claim 10, wherein:

a third switch, configured to be ON or to operate at the linear mode during the isolated switching regulator's operation, to convert the output voltage to the first power supply, to power the loop controller.

12. A power supplying method used in an isolated switching regulator, the isolated switching regulator including: a primary power switch coupled to a primary winding of a transformer, a secondary power switch coupled to a secondary winding of the transformer, a loop controller configured to provide a control signal, and a driver configured to drive the secondary power switch in response to the control signal, the power supplying method comprising:

powering the loop controller and the driver by an output voltage of the isolated switching regulator; and evaluating a power capability of the output voltage: if the output voltage is insufficient to power the driver, powering the driver by a voltage across the secondary winding; otherwise, continuing to power the driver by the output voltage.

13. The power supplying method of claim 12, wherein the step of evaluating a power capability of the output voltage comprises:

comparing a voltage level of a signal converted from the output voltage with a threshold voltage: if the voltage level of the signal converted from the output voltage is lower than the threshold voltage, indicating the power supply is insufficient to power the driver; otherwise, the power supply is capable to power the driver.

14. The power supplying method of claim 12, wherein the step of evaluating a power capability of the output voltage comprises:

converted from the voltage across the secondary winding, if the voltage level of the signal converted from the output voltage is lower than that converted from the voltage across the secondary winding, indicating the output voltage is insufficient to power the driver; otherwise, the power supply is capable to power the driver.

\* \* \* \* \*